United States Patent
Li et al.

(10) Patent No.: US 10,878,613 B2
(45) Date of Patent: Dec. 29, 2020

(54) SYSTEM AND METHOD FOR TRANSFERRING SURFACE INFORMATION FROM MASSIVE MESHES TO SIMPLIFIED MESHES USING VOXELS

(71) Applicant: Cesium GS, Inc., Exton, PA (US)

(72) Inventors: Kangning Li, North Wales, PA (US); Sean Lilley, Exton, PA (US)

(73) Assignee: Cesium GS, Inc., Philadelphia, PA (US)

( * ) Notice: Subject to any disclaimer, the term of this patent is extended or adjusted under 35 U.S.C. 154(b) by 0 days.

(21) Appl. No.: 16/705,964

(22) Filed: Dec. 6, 2019

(65) Prior Publication Data
US 2020/0184705 A1     Jun. 11, 2020

Related U.S. Application Data

(60) Provisional application No. 62/775,934, filed on Dec. 6, 2018.

(51) Int. Cl.
| | |
|---|---|
| *G06T 15/04* | (2011.01) |
| *G06T 1/20* | (2006.01) |
| *G06T 17/20* | (2006.01) |

(52) U.S. Cl.
CPC .............. *G06T 15/04* (2013.01); *G06T 1/20* (2013.01); *G06T 17/20* (2013.01); *G06T 2210/12* (2013.01)

(58) Field of Classification Search
CPC ............ G06T 15/04; G06T 1/20; G06T 17/20
USPC ....................................................... 345/424
See application file for complete search history.

(56) References Cited

U.S. PATENT DOCUMENTS

| | | | | |
|---|---|---|---|---|
| 5,570,460 | A * | 10/1996 | Ramanujam | G06T 17/20 345/424 |
| 8,217,939 | B1 * | 7/2012 | Bonciu | G06T 17/00 345/419 |
| 2002/0167518 | A1 * | 11/2002 | Migdal | G06T 17/20 345/428 |
| 2007/0024632 | A1 * | 2/2007 | Couture-Gagnon | G06T 17/20 345/581 |
| 2016/0321838 | A1 * | 11/2016 | Barone | H04N 1/00827 |
| 2017/0301133 | A1 * | 10/2017 | Min | G06T 17/205 |

* cited by examiner

*Primary Examiner* — Hai Tao Sun
(74) *Attorney, Agent, or Firm* — The Marbury Law Group, PLLC

(57) ABSTRACT

Systems, methods, devices, and non-transitory media of the various embodiments enable transferring surface information from one mesh to two-dimensional textures on another mesh. Embodiments may allocate a voxel data structure bounding both a source mesh and a target mesh, wherein the source mesh and the target mesh use different mesh parameterizations of a three-dimensional object. The source mesh may be rasterized in a source texture coordinate space to produce one or more source fragments, each source fragment comprising sampled data from a triangle of the source mesh and a three-dimensional position on the triangle on a surface of the source mesh. For each of the one or more source fragments a voxel may be determined, of the voxel data structure, corresponding to the source fragment's respective three-dimensional position, and the sampled data of the source fragment may be written into the determined voxel of the voxel data structure.

29 Claims, 15 Drawing Sheets

SYSTEM AND METHOD FOR TRANSFERRING SURFACE INFORMATION FROM MASSIVE MESHES TO SIMPLIFIED MESHES USING VOXELS

RELATED APPLICATIONS

This application claims priority to U.S. Provisional Application No. 62/775,934 filed on Dec. 6, 2018 entitled "System and Method For Transferring Surface Information From Massive Meshes to Simplified Meshes Using Voxels," the entire contents of which are hereby incorporated by reference.

BACKGROUND

Computer graphics, and especially three-dimensional visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render. Additionally, high quality three-dimensional objects may not be needed in every visualization. For example, when a camera view point for a three-dimensional model is zoomed out sufficiently, a low-quality three-dimensional object may be suitable for rendering.

SUMMARY

The systems, methods, devices, and non-transitory media of the various embodiments enable baking surface information from one mesh to two-dimensional textures on another mesh. Various embodiments may provide a method for transferring surface information from massive meshes to simplified meshes using voxels. Various embodiments may provide a method for transferring surface information including rasterizing of triangles from a source mesh, writing surface information into a voxel grid, and writing the surface information into a target mesh's textures. The use of voxels may make the various embodiment methods highly scalable with regards to the amount of surface information by permitting out-of-core baking. The use of voxels may map well for many types of surface information to the rasterization hardware and parallelism available on Graphics Processing Units (GPUs).

Various embodiments may include methods for transferring surface information including allocating a voxel data structure bounding both a source mesh and a target mesh, wherein the source mesh and the target mesh use different mesh parameterizations of a three-dimensional object, rasterizing the source mesh in a texture coordinate space to produce one or more source fragments, each source fragment comprising sampled data from a triangle of the source mesh and a three-dimensional position on the same triangle on the surface of the source mesh, and for each of the one or more source fragments determining a voxel of the voxel data structure corresponding to the source fragment's respective three-dimensional position, and writing the sampled data of the source fragment into the determined voxel of the voxel data structure. The methods may further include rasterizing the target mesh in a texture coordinate space to produce one or more target fragments, each target fragment comprising sampled data from a triangle of the target mesh and a three-dimensional position on the same triangle on the surface of the target mesh, and for each of the one or more target fragments, determining the voxel of the voxel data structure nearest a position corresponding to the target fragment, and writing the sampled data from the determined voxel of the voxel data structure into texture data of the target mesh at the fragment's two-dimensional position in a texture space. Various embodiments may include rendering at least a portion of the target mesh with the sampled data written into the texture data on a display. In various embodiments, the rendered target mesh may have a lower level of detail than the source mesh.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

In three-dimensional visualization, in accordance with various embodiments, it can be beneficial to create multiple versions of a three-dimensional object, such as a high-quality version and a low-quality version. Multiple versions may be useful for circumstances in which both a high-quality version and a low-quality version are or may be needed, such as needed for rendering.

Textures are often used in computer graphics to increase the detail of information on the surface of triangle meshes (also referred to as simply "meshes" herein). Surface information may include base color, static light color/intensity, influence weight for deformation algorithms, and parameters for shading algorithms, such as bump mapping or subsurface scattering.

Figure 1:
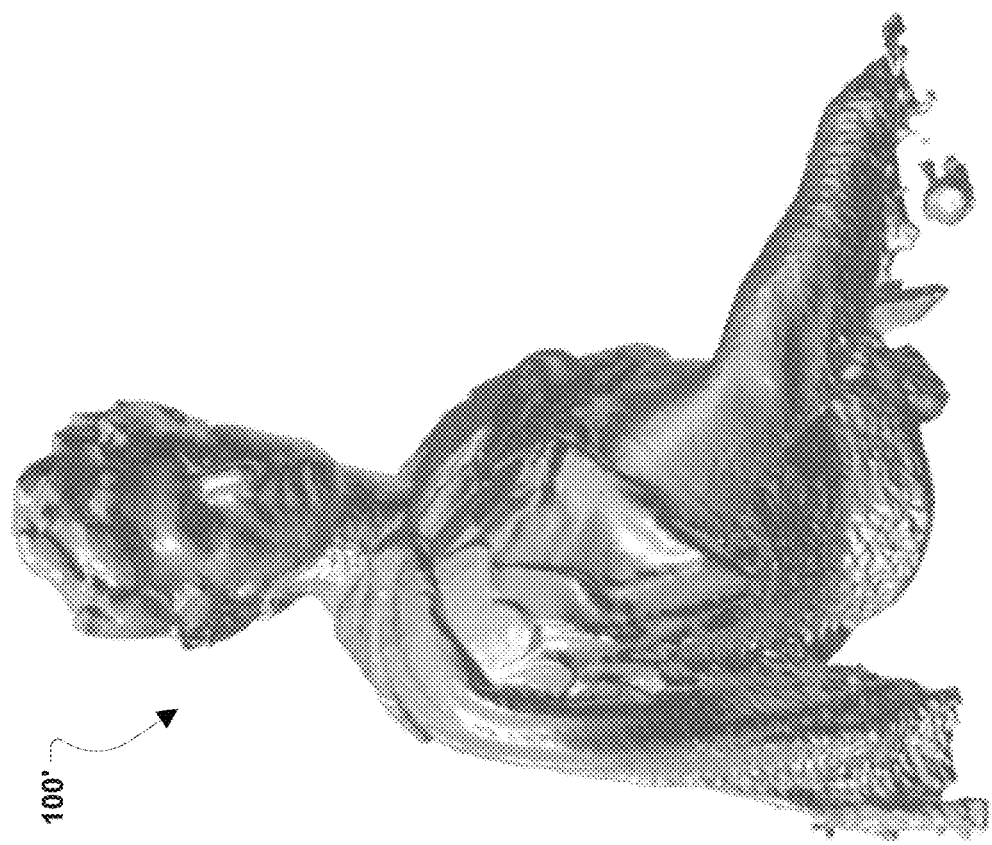
FIG. 1 illustrates a source mesh with and without surface texture information visualized.
Figure 1:
Figure 2:
FIG. 2 illustrates a parameterization for accessing or modifying surface information of the source mesh FIG. 1.
Figure 3:
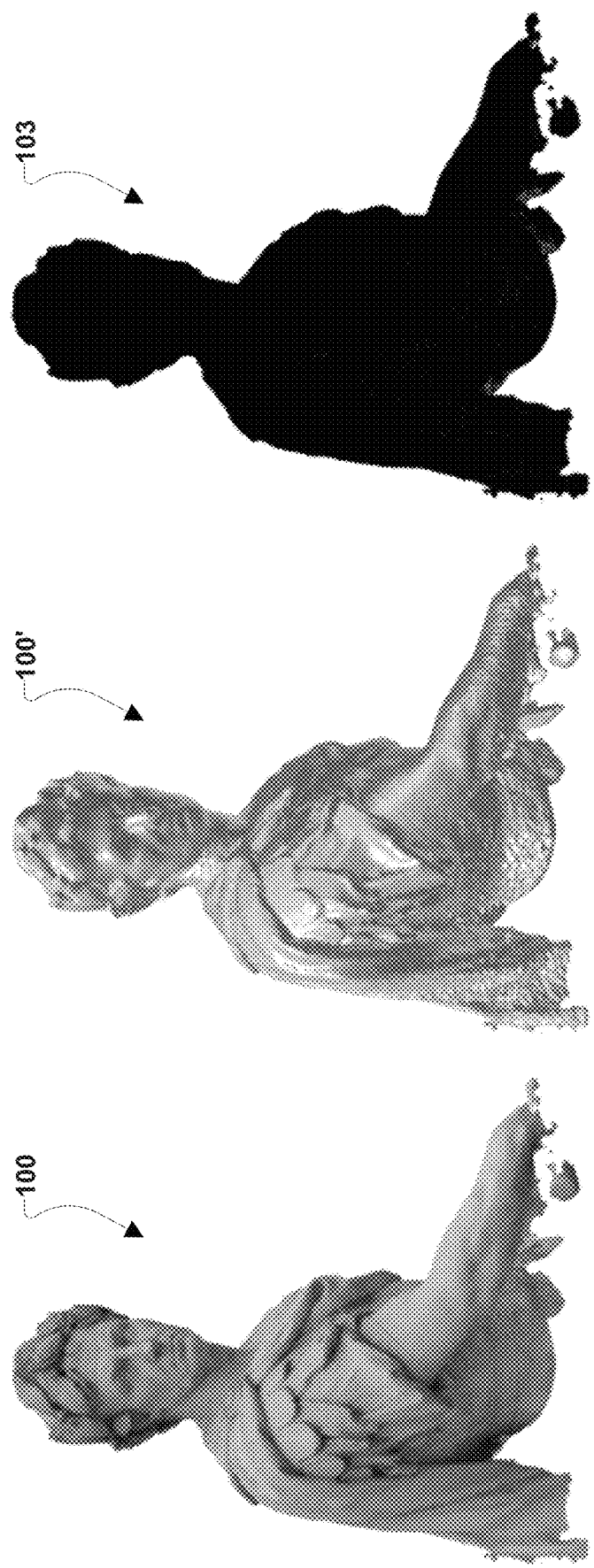
FIG. 3 illustrates the source mesh with and without surface texture information visualized of FIG. 1 side-by-side with a wireframe view of the three-dimensional object.

Textured meshes are often implemented using two-dimensional per-vertex texture coordinates, which place each vertex in the mesh on a two-dimensional image. These texture coordinates are then interpolated over the surface of each triangle, allowing the two-dimensional texture to be "wrapped" around the three-dimensional mesh. Topologically closed meshes may be divided into non-overlapping pieces, maintaining a mapping of each piece to its origin source. The divided and mapped pieces may be laid flat in two dimensions and laid out across multiple images. This division and mapping is referred to as "parameterization" of a mesh. As an example, FIG. 1 illustrates a source mesh 100 with surface texture information visualized and a source mesh 100' with surface texture information hidden. The example shown in FIG. 1 of a source mesh 100 may be a five-dimensional mesh having data for x,y,z coordinates of the points and two texture coordinates for each point in the mesh as well. While meshes as discussed herein in various examples in relation to a specific number of dimensions, multidimensional meshes may include more or less dimensions of data, such as two, three, four, five, six, seven, or more dimensions of data. The textures are hidden in the source mesh 100' to illustrate differences in geometry detail that make up the dimensions or aspects of the source mesh. FIG. 2 illustrates an example of a parameterization 102 for accessing or modifying surface information of the source mesh 100. The parameterization 102 for accessing or modifying surface information of the source mesh 100 may be produced by segmenting a triangle mesh corresponding to a wireframe view of the source mesh 100' with surface texture information hidden into groups of triangles that lay flat in two-dimensions. Although the parameterization 102 is illustrated as a single visualization, the parameterization 102 may be composed of a plurality of sub-parameterizations that together form the whole. FIG. 3 illustrates side-by-side views of the source mesh 100, the source mesh 100', and a wireframe view 103 of the source mesh.

Many computer graphics applications benefit from having simplified versions of a triangle mesh that, when combined with corresponding textures and texture coordinates, provide a similar visual appearance to a source triangle mesh in cases where the source mesh may be unsuitable for rendering, such as due to the amount of polygon and/or texture data in the source mesh.

Because the source mesh may have incompatible or different parameterization relative to the simplified mesh, or may be missing parameterization and textures entirely, many mesh editing applications generate textures for a simplified mesh that approximate the source mesh's surface information in a process generally referred to as "baking."

One approach to baking is to use ray tracing to approximate the source mesh's (i.e., the original mesh's) surface information on the simplified mesh (i.e., the target mesh). In ray tracing, when information is baked from the source mesh to the target mesh, the source mesh and the target mesh are overlapped in three-dimensional space and rays are cast from various points on the target mesh through the source mesh. Each ray is then used to map the surface texture from the point on source mesh where the ray terminates to the point on the target mesh where the ray originates on the target mesh. In this manner, information from the source mesh's surface and/or texture may be sampled and written into the target mesh's texture. However, the use of such ray tracing may be computationally expensive when the source mesh and/or texture are extremely large. For example, the source mesh may be formed from hundreds of millions of triangles and spread across several hundreds of files on disk. The color information for the source mesh may also be spread across thousands of textures as well. Loading the entire source mesh and color information together into memory and using rays to connect the source mesh and the target mesh may be impractical in such an example.

As current baking methods may be impractical and/or computationally expensive, an alternative method for transferring of surface information from complicated three-dimensional meshes to simplified three-dimensional meshes is needed.

The systems, methods, devices, and non-transitory media of the various embodiments enable baking (i.e., transferring) surface information from one mesh to two-dimensional textures on another mesh. Various embodiments may provide a method for transferring surface information from massive meshes to simplified meshes using voxels. Various embodiments may provide a method for transferring surface information including rasterizing of triangles from a source mesh, writing surface information into a voxel grid, and writing the surface information into a target mesh's textures. The use of voxels may make the various embodiment methods highly scalable with regards to the amount of surface information by permitting out-of-core baking. The use of voxels may map well for many types of surface information to the rasterization hardware and parallelism available on Graphics Processing Units (GPUs).

In various embodiments, the method for transferring surface information may include receiving as an input a parameterized source mesh and a target mesh that resembles the source mesh in three-dimensions and has been parameterized into non-overlapping segments in texture space. The target mesh may have sufficient textures for the target mesh to hold the transferred surface information at some desired resolution and sample granularity. The method may include allocating a voxel data structure, rasterizing the source mesh in texture coordinate space and sampling and writing surface information into the voxel data structure from the source mesh, and rasterizing the target mesh in texture coordinate space and reading surface information out of the voxel data structure and writing that surface information into the textures of the target mesh.

In various embodiments, allocating a voxel data structure may include allocating a voxel grid that will store information about the source mesh's surface. The voxel grid may cover a three-dimensional bounding box that bounds both the source mesh and the target mesh when overlapped in three-dimensional space. Grid resolution may be allocated based on the target texture resolution or alternatively by bounding box size and distance in space, such as meters, centimeters, or millimeters. Voxels in the grid may store surface information in various ways, including but not limited to, a single value of surface information or the average of many surface samples. For example, if the surface mesh information being transferred consists of 24-bit RGB color, each voxel cell may include a single 24-bit RGB value that will represent a single sample of surface information. As another example, if the surface mesh information being transferred consists of 24-bit RGB color, each voxel cell may alternatively store the sum of all samples covered by the cell using floating point values and a counter used with the sum to compute an average of all samples. The voxel grid may be implemented using various data structures including spatial hash grids, octrees, or arrays with a three-dimensional indexing scheme.

In various embodiments, rasterizing the source mesh and writing the sampled texture data into the voxel data structure may include rasterizing each triangle in the source mesh in texture coordinate space—that is, the triangles are drawn to match the source mesh's parameterization. If the surface information being sampled is stored in textures, rasterization in texture coordinate space may occur at the same resolution as the source textures, ensuring that all surface data will be sampled. Alternatively, rasterization may occur at lower resolution such as the target resolution for improved performance, especially if the source mesh and textures are very large.

Rasterization produces fragments, each containing a texture coordinate, a three-dimensional position on the surface of the mesh, and possibly other interpolated per-vertex attributes such as vertex color, static lighting information, or surface normals. Any combination of these attributes may be the sampled data to be applied to the surface of the target mesh, although typically the texture coordinate is used to sample surface information out of source textures or procedural texturing algorithms.

The three-dimensional position is used to compute the voxel that will accept the fragment's sample information, and the sample is written into the voxel grid. On a processor with hardware rasterization and programmable fragment processing, such as a GPU, this step may be implemented as a multi-pass technique in which fragments are first written to a temporary buffer after rasterization. A second pass may then draw points that look up sample information and voxel addresses in the vertex shader, then write this information to the voxel grid in the fragment shader. This multi-pass technique may take advantage of GPU color blending operations, such as additive or replacement blending. Alternatively, an implementation with compute shaders may directly read the fragment information out of the temporary buffer and write it into the voxel grid using a compute pass. Some systems with compute shaders may offer atomic operations that may achieve the same goal, which may be to avoid conflicts when writing multiple color samples to the same voxel cell at the same time.

If the voxel grid accumulates the averages of samples, the order in which the samples are added does not matter. Thus an out-of-core implementation for this stage may load a portion of the source mesh and any associated texture data into memory, run both passes over this portion to add samples to the voxel grid, then replace it in memory with another portion of the source mesh and other associated texture data, repeating until the entire mesh has been sampled.

In various embodiments, rasterizing the target mesh and reading from the voxel data structure may include, after the source mesh has been fully sampled, each triangle in the target mesh being rasterized in texture coordinate space at the same resolution as the target mesh's textures. This rasterization stage may produce fragments each containing a texture coordinate and a three-dimensional position on the surface of the target mesh. The position on the surface of the target mesh may be used to search the voxel data structure for the nearest voxel cell containing samples from the source mesh's surface. The texture coordinate may then be used to write the sample into the target mesh's textures. On a processor with hardware rasterization and programmable fragment processing, such as a GPU, this stage may be implemented as a single rasterization pass if the sampled data type requires a sufficiently small amount of space for storage, such as 24-bit RGB color. The neighbor search radius may be limited to some distance in three-dimensional space to improve performance. For example, if the target mesh is known to have been produced from the source mesh using vertex clustering, the neighbor search radius may be limited to the size of the cells in the vertex clustering implementation.

Figure 4:
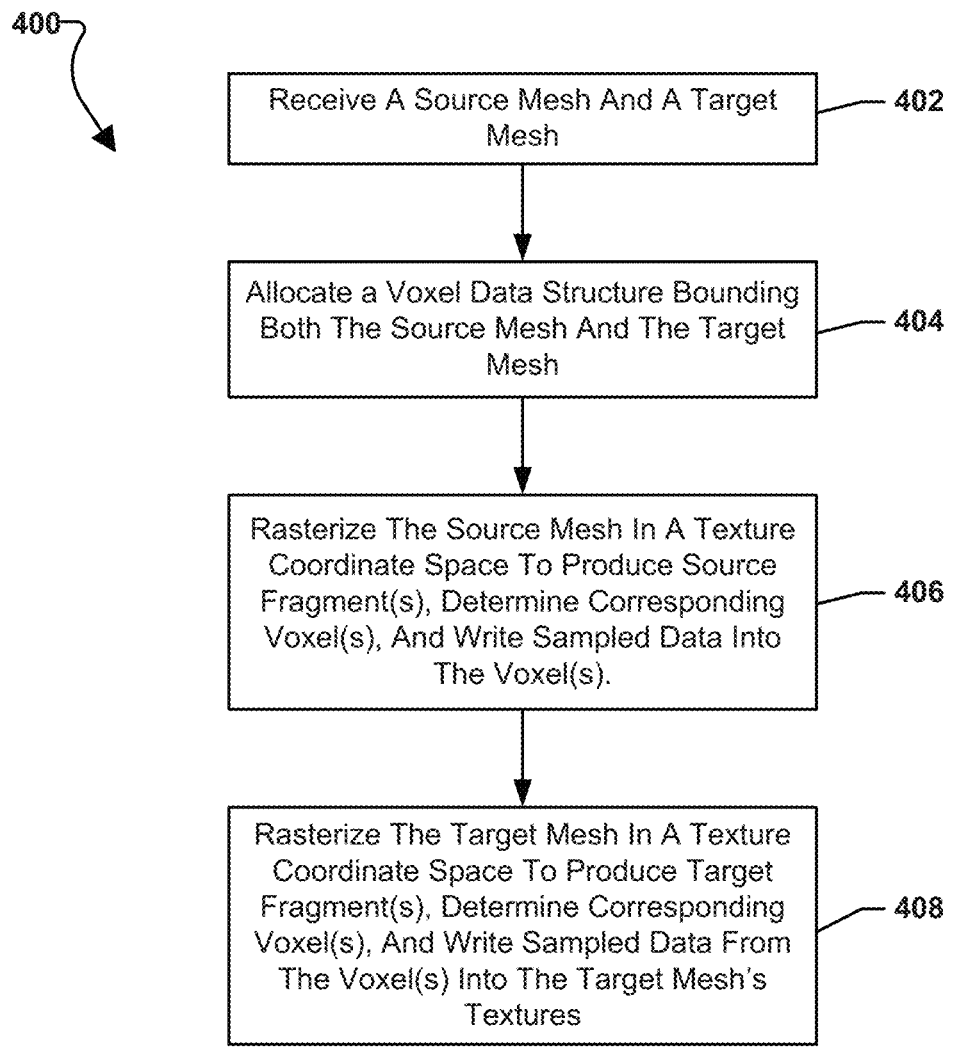
FIG. 4 is a process flow diagram illustrating an embodiment method for transferring surface information.

FIG. 4 illustrates an embodiment method 400 for transferring surface information. In various embodiments, the operations of method 400 may be performed by a component of a computing device, such as a central processor, a GPU, etc. The operations of method 400 may produce a target mesh with surface information sampled from a source mesh. The target mesh with the surface information sampled from the source mesh may be rendered on a display with a lower level of detail than that of the source mesh.

Figure 5:
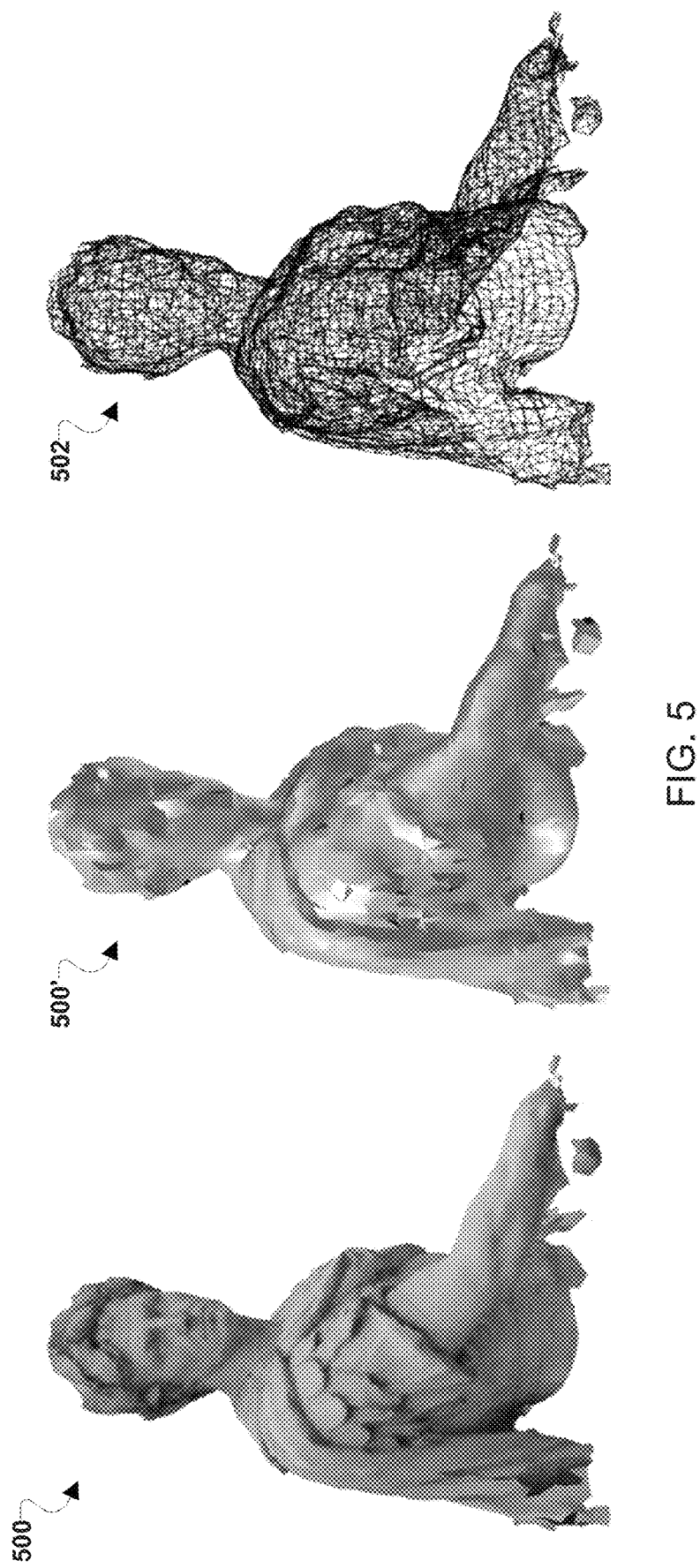
FIG. 5 illustrates a target mesh of the three-dimensional object of FIG. 1 with and without surface texture information visualized side-by-side with a wireframe view of the target mesh.
Figure 6:
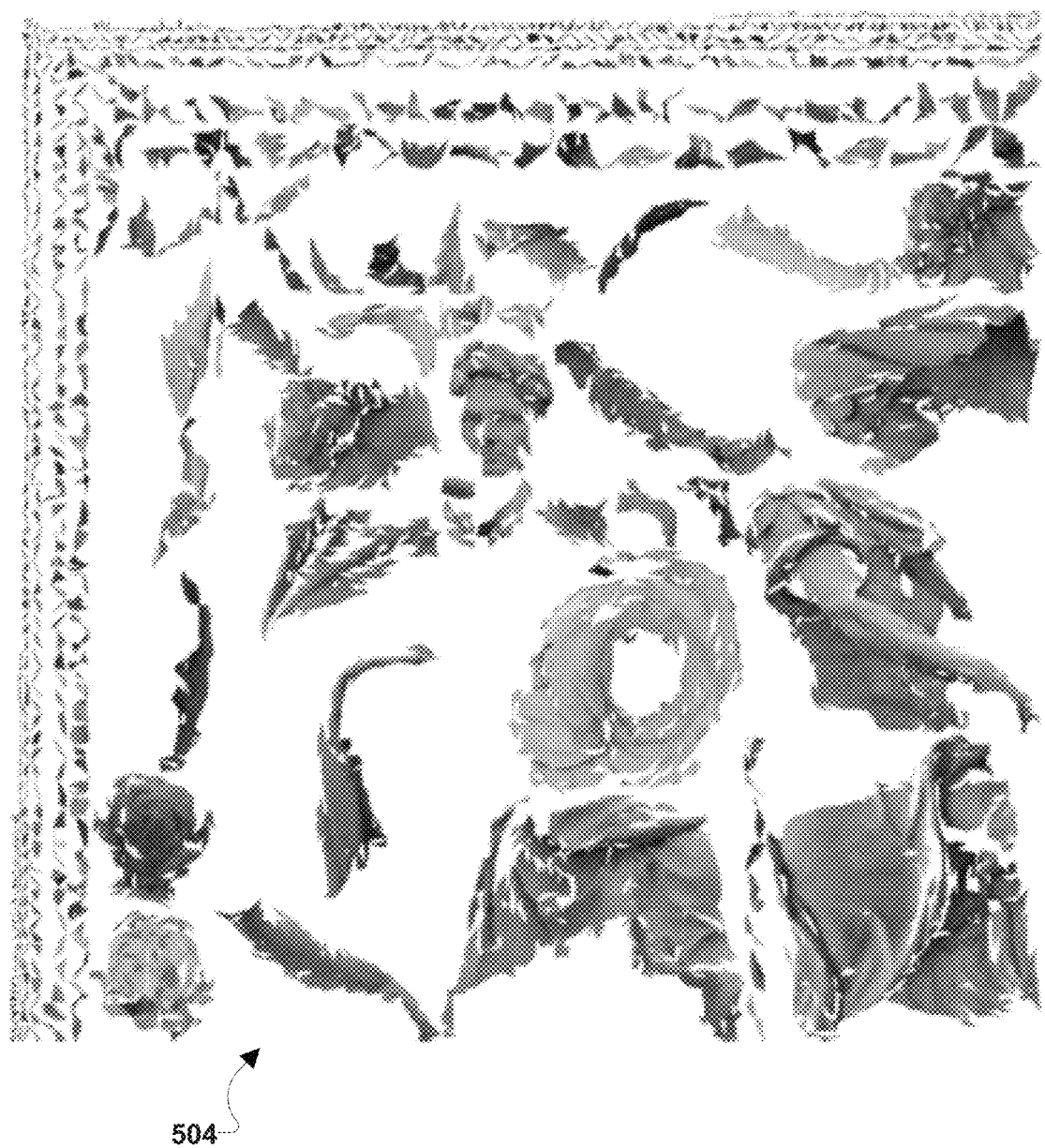
FIG. 6 illustrates a parameterization for accessing or modifying surface information of the target mesh of FIG. 5.
Figure 7:
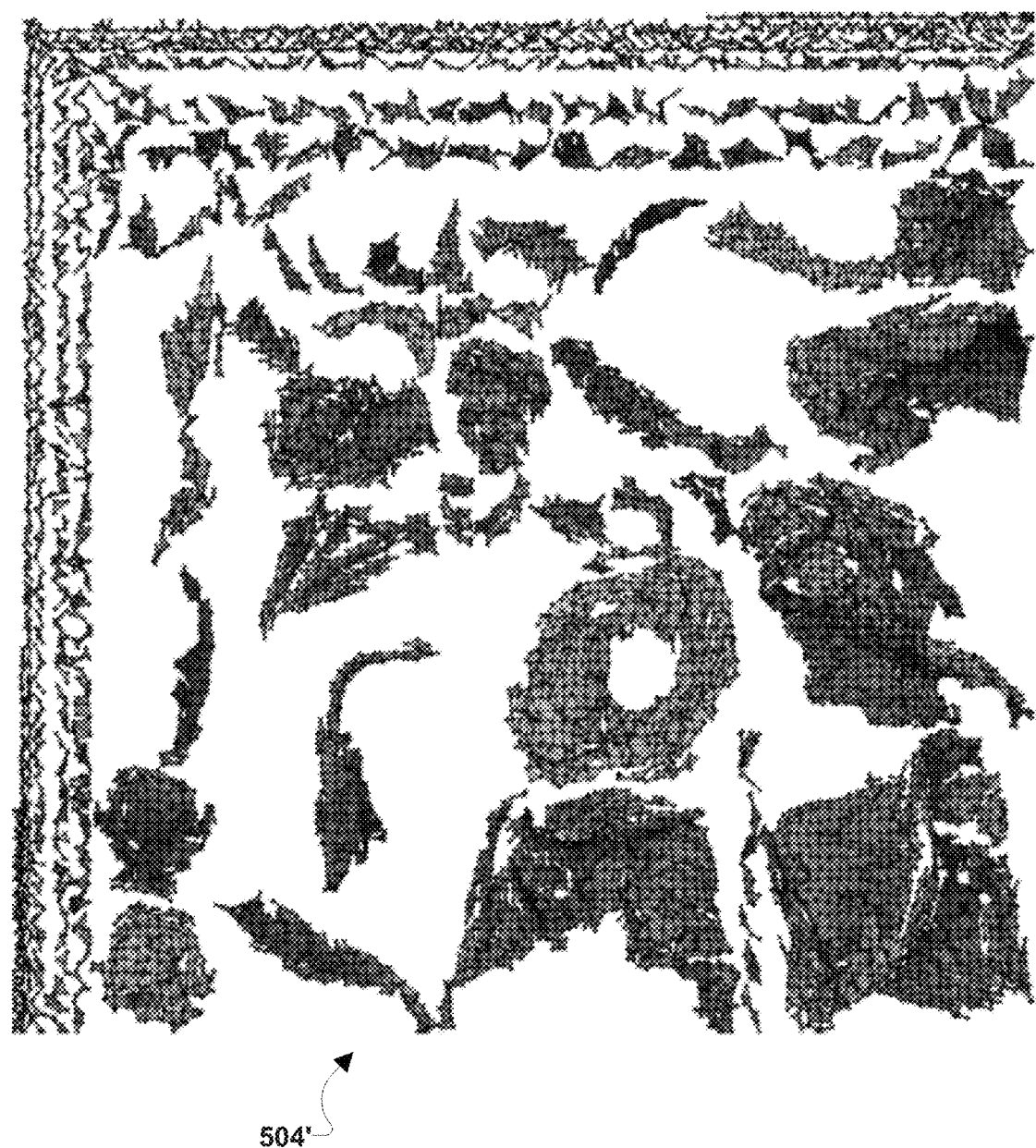
FIG. 7 illustrates a combined visualization of the parameterization of FIG. 6 with triangles from the wireframe view of FIG. 5 superimposed over the target mesh.
Figure 8:
FIG. 8 is a comparison of the source mesh with surface texture information visualized of FIG. 1 to the target mesh with surface texture information visualized of FIG. 5.
Figure 8:

In block 402, the computing device may receive a source mesh and a target mesh. In various embodiments, the source mesh and the target mesh may use different mesh parameterizations of a three-dimensional object. In other words, the source mesh and the target mesh may be representations of the same three-dimensional object at different levels of geometric detail, flattened into two-dimensions differently. For example, the parameterization may be the parameterization 102 for accessing or modifying surface information of the source mesh shown in FIG. 2. FIG. 6 illustrates a parameterization 504 for accessing or modifying surface information of a target mesh. The parameterization 504 for accessing or modifying surface information of the target mesh may be generated from a low-density mesh, in comparison to the parameterization 102 for accessing or modifying surface information of the source mesh. The parameterization 504 for accessing or modifying surface information of the target mesh may be produced from the same three-dimensional object as the parameterization (e.g., 102 in FIG. 2) for accessing or modifying surface information of the source mesh but at a lower level of geometric detail. FIG. 5 illustrates a target mesh 500 with surface texture information visualized, a target mesh 500'with surface texture information hidden, and a wireframe view 502 of the target mesh. FIG. 7 illustrates a combined visualization 504' formed by the triangles from the wireframe view (e.g., 502) being superimposed over the parameterization (e.g., 504) for accessing or modifying surface information of the target mesh. The textured geometry of the parameterization 504 for accessing or modifying surface information of the target mesh illustrated in FIG. 6 may be generated according to various embodiment operations, such as the operations of method 400 described further below. FIG. 8 illustrates the source mesh 100 with surface texture information visualized and the target mesh 500 with surface texture information visualized, illustrating that the target mesh 500 with surface texture information visualized may be a lower density image of the three-dimensional object, as compared to the source mesh 100 with surface texture information visualized.

Figure 9:
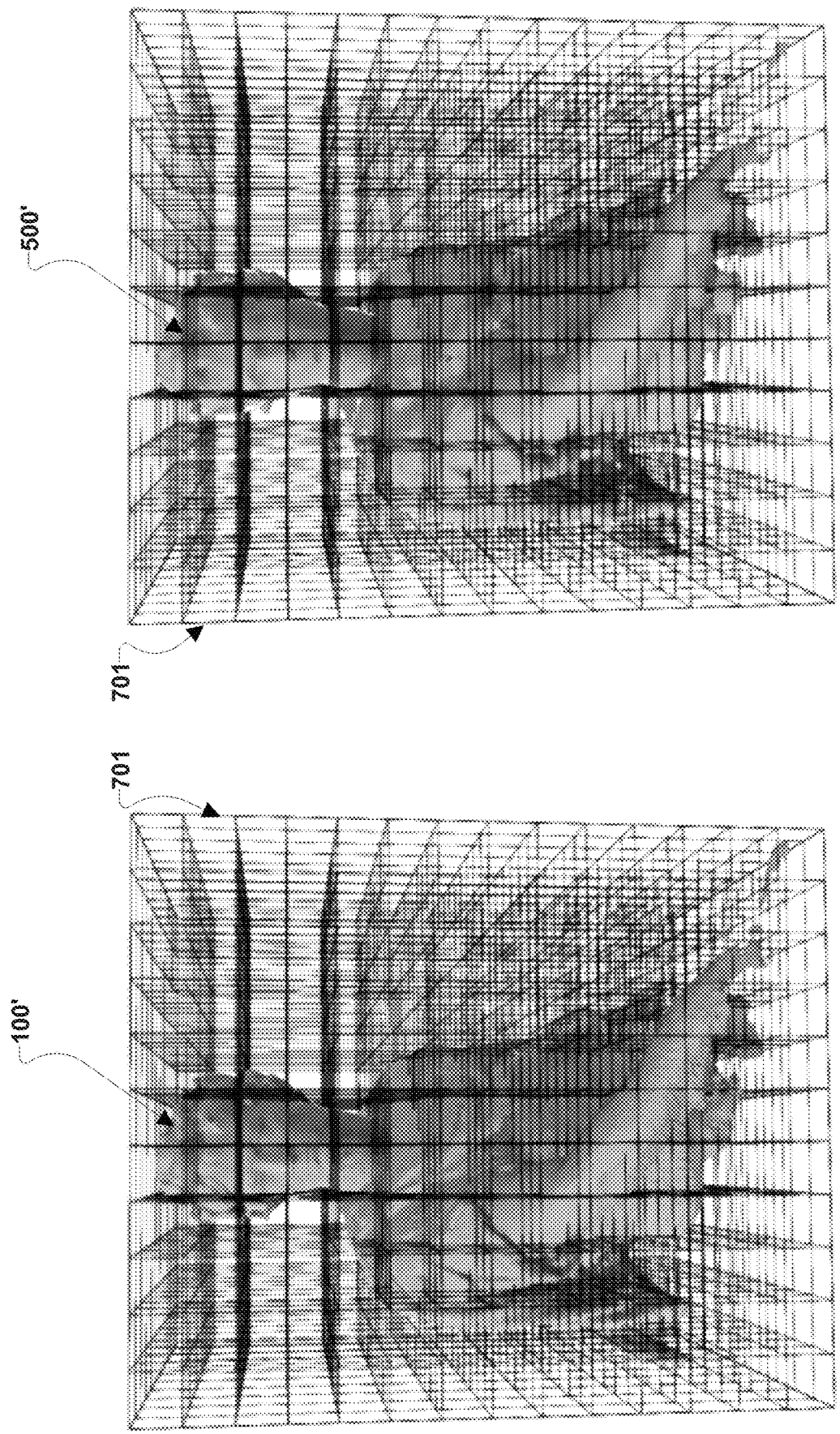
FIG. 9 illustrates a voxel grid bounding a source mesh and a target mesh.

Referring back to FIG. 4, in block 404, the computing device may allocate a voxel data structure bounding both the source mesh and the target mesh. In various embodiments, the voxel data structure may be a voxel grid. FIG. 9 illustrates an example of a voxel data structure in the form of voxel grid 701, bounding the source mesh 100' with surface texture information hidden, alongside the target mesh 500' with surface texture information hidden when overlapped in three-dimensional space. In various embodiments, allocating a voxel data structure may include allocating the voxel grid 701 that may store information about the source mesh's surface (i.e., a surface of the source mesh 100' with surface texture information hidden). The voxel grid 701 may cover a three-dimensional bounding box that bounds both the source mesh 100' with surface texture information hidden and the target mesh 500' with surface texture information hidden. Grid resolution may be allocated based on the target texture resolution or alternatively by bounding box size and distance in space, such as meters, centimeters, or millimeters. Voxels in the voxel grid 701 may store surface information in various ways, including but not limited to, a single value of surface information or the average of many surface samples. For example, if the source mesh 100' with surface texture information hidden information being transferred consists of 24-bit RGB color, each voxel cell may include a single 24-bit RGB value that may represent a single sample of surface information. As another example, if the source mesh 100' with surface texture information hidden information being transferred consists of 24-bit RGB color, each voxel cell may alternatively store the sum of all samples covered by the cell using floating point values and a counter used with the sum to compute an average of all samples. The voxel grid 701 may be implemented using various data structures including spatial hash grids, octrees, or arrays with a three-dimensional indexing scheme. In various embodiments, the voxel grid 701 may be of various sizes. For example, the voxel grid 701 may be a 512 by 512 by 512 grid.

Referring back to FIG. 4, in block 406, the computing device may rasterize the source mesh in a texture coordinate space to produce one or more source fragments, determine one or more corresponding voxels, and write sampled data into the one or more voxels. In some embodiments, rasterizing the source mesh in a texture coordinate space to produce one or more source fragments, determining one or more corresponding voxels, and writing sampled data into the one or more voxels may include rasterizing the source mesh in a texture coordinate space to produce one or more source fragments, each source fragment comprising sampled data for a triangle of the source mesh and a three-dimensional position on the surface of the same triangle from the source mesh. For each of the one or more source fragments, the computing device may determine a voxel of the voxel data structure corresponding to the source fragment's respective three-dimensional position and write the sampled data of the source fragment into the determined voxel of the voxel data structure. In various embodiments, rasterizing the source mesh and writing the sampled texture data into the voxel data structure may include rasterizing each triangle in the source mesh in texture coordinate space—that is, the triangles are drawn to match the source mesh's parameterization. If the surface information being sampled is stored in textures, rasterization in texture coordinate space may occur at the same resolution as the source textures, ensuring that all surface data will be sampled. Alternatively, rasterization may occur at lower resolution such as the target resolution for improved performance, especially if the source mesh and textures are very large.

Figure 10:
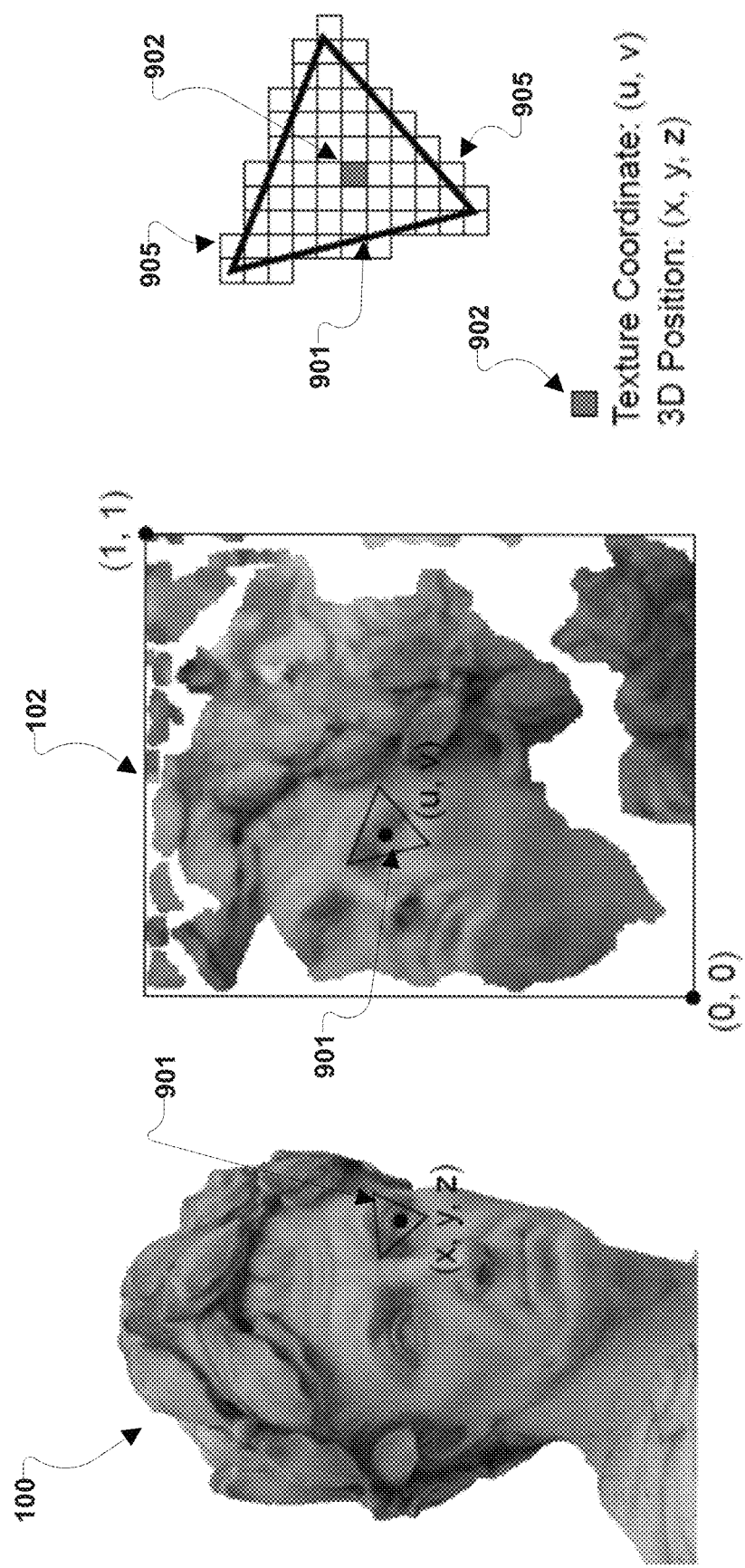
FIG. 10 illustrates a fragment generated by rasterization of a source mesh according to various embodiments.

FIG. 10 illustrates an example of rasterization of the source mesh (i.e., 100) that may occur in the operations of block 406. Rasterization produces fragments, each containing a texture coordinate, a three-dimensional position in a triangle on the surface of the mesh, and possibly other interpolated per-vertex attributes such as vertex color, static lighting information, or surface normals. Any combination these attributes may be the sampled data to be applied to the surface of the target mesh, although typically the texture coordinate is used to sample surface information out of source textures or procedural texturing algorithms. For example, a three-dimensional position with the coordinates x, y, z may be inside a triangle 901 of the source mesh 100 and have a corresponding position in the parameterization 102 for accessing or modifying surface information of the source mesh 100. For example, the parameterization 102 for accessing or modifying surface information of the source mesh 100 may include the texture coordinate u,v corresponding to the three-dimensional position x, y, z on the triangle 901. Rasterization of the triangle 901 may produce multiple fragments 905 containing two-dimensional texture coordinates in the parameterization 102 for accessing or modifying surface information of the source mesh. The rasterization of the triangle 901 may produce a fragment 902 including the texture coordinate (u,v) and the three-dimensional position (x,y,z). The three-dimensional position (x,y,z) may be used to compute the voxel that will accept sample information of the fragment 902, and the sample is written into the voxel grid 701.

On a processor, such as a GPU, the operations of block 406 may be implemented as a multi-pass technique in which fragments are first written to a temporary buffer after rasterization. A second pass may then draw points that look up sample information and voxel addresses in the vertex shader, then write this information to the voxel grid in the fragment shader. Alternatively, an implementation of the operations of block 406 with compute shaders may directly read the fragment information out of the temporary buffer and write it into the voxel grid 701 using a compute pass.

If the voxel grid 701 accumulates the averages of samples, the order in which the samples are added does not matter. Thus, an out-of-core implementation for the operations of block 406 may load a portion of the source mesh, with any associated texture data (e.g., a portion of source mesh 100), as well as the associated parameterization for accessing or modifying surface information (e.g., a portion of parameterization 102) into memory, run both passes over this portion to add samples to the voxel grid 701, then replace it in memory with another portion of the source mesh, with its associated texture data (e.g., another portion of source mesh 100), as well as the associated parameterization for accessing or modifying surface information (e.g., another portion of parameterization 102), repeating until all of the source mesh with its parameterization for accessing or modifying its surface information has been sampled. In this manner, though the source mesh may be spread over many files and may have a data size larger than can be supported in a memory, such as a buffer, the operation of block 406 may be applied to the source mesh in sub-portions and the voxel grid 701 may be populated sequentially. As such, all of the source mesh with its parameterization for accessing or modifying its surface information may not need to be rasterized and written into the voxel data structure at one time. Accordingly, in some embodiments, rasterizing the source mesh in a texture coordinate space to produce one or more source fragments may include rasterizing successive portions of the source mesh with its parameterization for accessing or modifying its surface information such that the sampled data from one or more source fragments of a first portion of the source mesh and parameterization are written into the voxel data structure before a second portion of the source mesh and parameterization is rasterized.

Referring back to FIG. 4, in block 408, the computing device may rasterize the target mesh in a texture coordinate space to produce one or more target fragments, determine one or more corresponding voxels, and write the sampled data from the one or more voxels to the target mesh's textures. In various embodiments, rasterizing the target mesh in a texture coordinate space to produce one or more target fragments, determining one or more corresponding voxels, and writing the sampled data from the one or more voxels to the target mesh's textures may include rasterizing the target mesh in a texture coordinate space to produce one or more target fragments, each target fragment comprising data texture coordinate from a triangle of the target mesh and a three-dimensional position on the surface of the same triangle from the target mesh. For each of the one or more target fragments, the computing device may determine the voxel of the voxel data structure nearest corresponding to the target fragment and write the sampled data from the determined voxel of the voxel data structure into texture data of the target mesh at the fragment's two-dimensional texture coordinate in the texture of the target mesh.

Figure 11A:
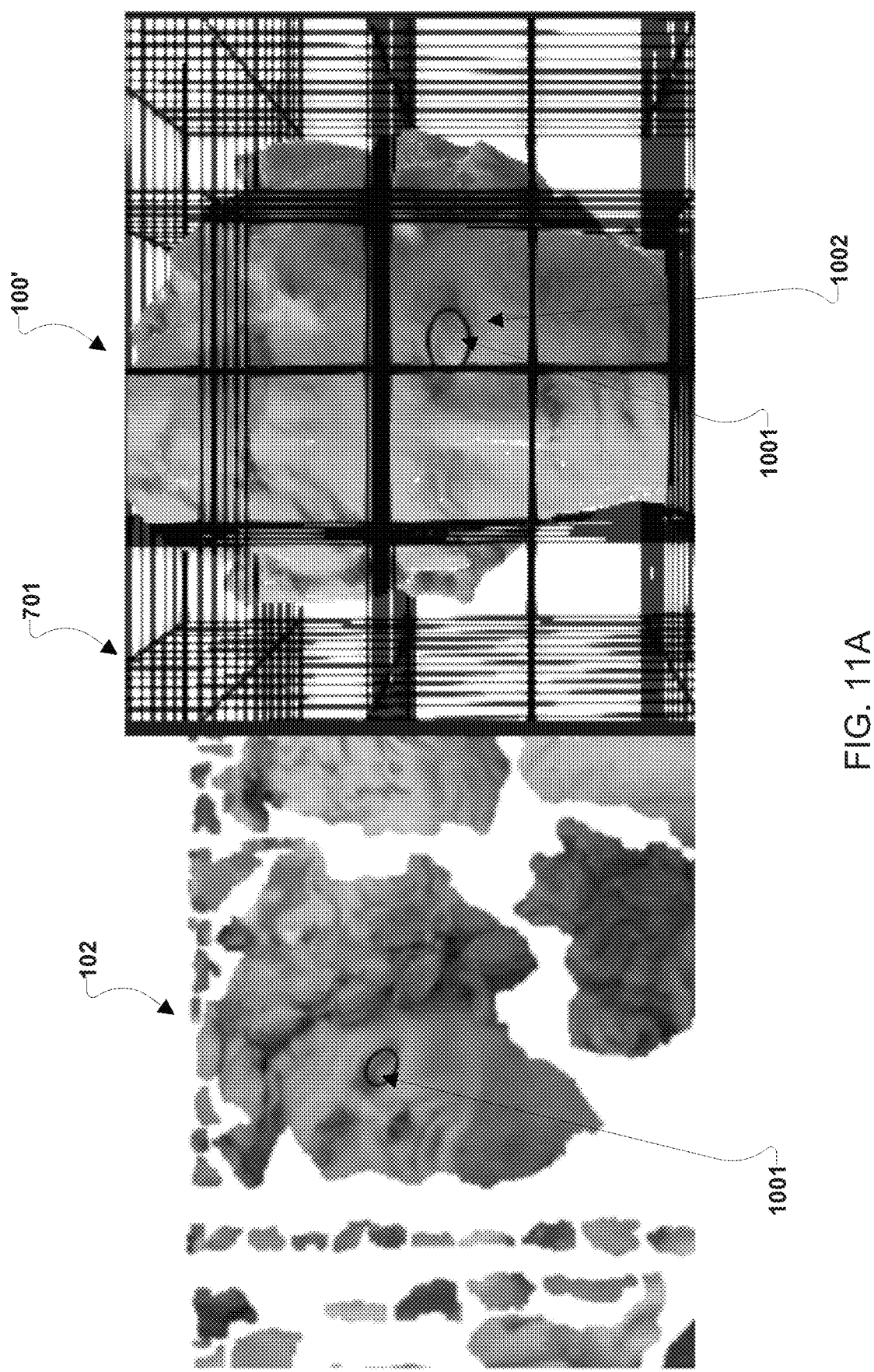
FIGS. 11A-11B illustrate the writing of texture information from a source mesh into a voxel and the writing of texture information from the voxel into a target mesh.
Figure 11B:
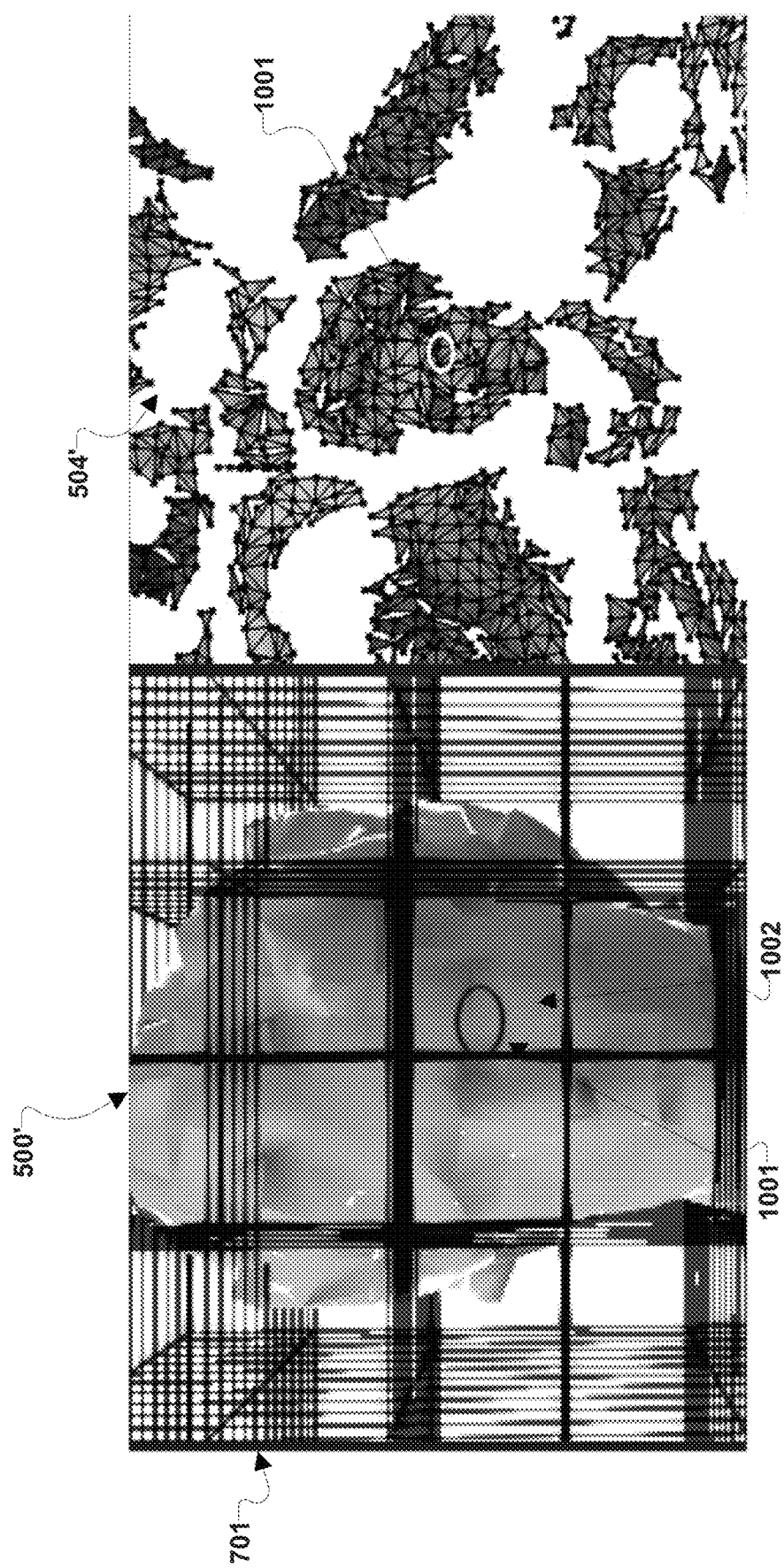
Figure 11C:
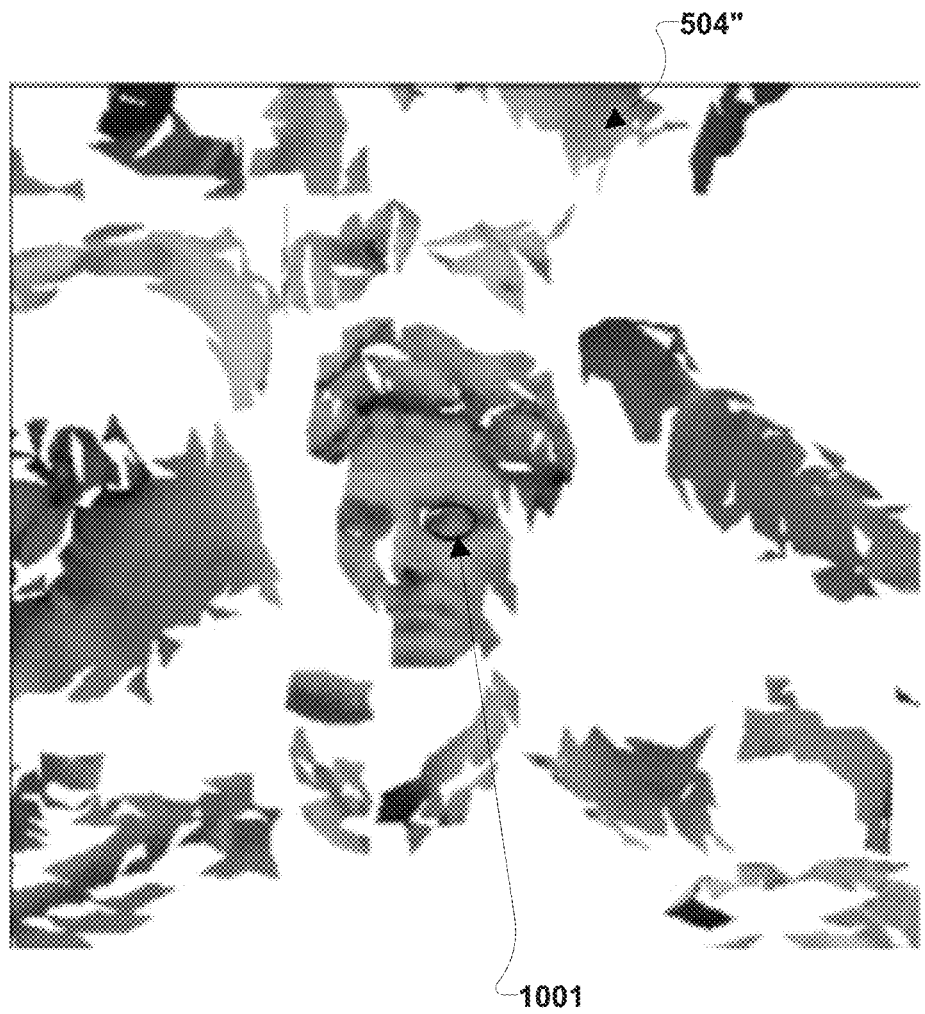
FIG. 11C illustrates a parameterization for accessing or modifying surface information of the target mesh including the texture information written from the voxels as shown in FIG. 11B.

FIGS. 11A-11C illustrate the writing of texture information from a source mesh (e.g., 100 in FIG. 1) into a voxel 1002 of a voxel grid 701 and the writing of texture information from the voxel 1002 into a target mesh (e.g., 500 in FIG. 5). For illustrative purposes, FIG. 11A only shows a portion of the parameterization 102 for accessing or modifying surface information of the source mesh. In various embodiments, rasterizing the target mesh (e.g., 500) and reading from the voxel data structure (i.e., the voxel grid 701) may include, after the source mesh (e.g., 100) has been fully sampled, each triangle in the target mesh may be rasterized in texture coordinate space at the same resolution as textures of the target mesh. This rasterization stage may produce fragments each containing a two-dimensional texture coordinate in the parameterization (e.g., 504) for accessing or modifying surface information of the target mesh (e.g., 500) and a three-dimensional position on the surface of the target mesh. The position on the surface of the target mesh may be used to search the voxel grid 701 for the nearest voxel (e.g., voxel 1002) containing samples from the surface of the source mesh. The texture coordinate may then be used to write the sample into textures of the target mesh.

FIGS. 11A-11B illustrate an example of the texture of the region of an eye 1001 of the three-dimensional object being transferred from the source mesh to the target mesh. FIG. 11B illustrates a portion of the combined visualization 504' formed by the triangles from the wireframe view (e.g., 502) being superimposed over the parameterization (e.g., 504) with the example of the texture of the region of an eye 1001 of the three-dimensional object being transferred from the source mesh to the target mesh. FIG. 11C illustrates that region of the eye 1001 on a portion of the parameterization 504". The region of the eye 1001 may correspond to the voxel 1002 of the voxel grid 701 as shown by the geometry of the source mesh 100' with surface texture information hidden. The texture information in the voxel 1002 may have been sampled from the region of the eye 1001 in the source mesh 100' with surface texture information hidden, and the same region of the eye 1001 in the target mesh 500' with surface texture information hidden may map to the voxel 1002. The texture information in the voxel 1002 may then be written from the voxel 1002 into the target mesh to give the target mesh a texture. In this manner, texture from the source mesh may be mapped to the target mesh via the voxel grid 701.

On a processor with hardware rasterization and programmable fragment processing, such as a GPU, the operations of block 408 may be implemented as a single rasterization pass if the sampled data type requires a sufficiently small amount of space for storage, such as 24-bit RGB color. The neighbor search radius may be limited to some distance in three-dimensional space to improve performance. For example, if the target mesh (e.g., 500) is known to have been produced from the source mesh (e.g., 100) using vertex clustering, the neighbor search radius may be limited to the size of the cells in the vertex clustering implementation.

The operations of method 400 may result in information about a target mesh 500 with surface texture information written into it stored in a memory and available for rendering on a display. This target mesh 500 with surface texture information written into it may be rendered on a display as a low-density version of the source mesh 100 with surface texture information written into it.

Figure 12:
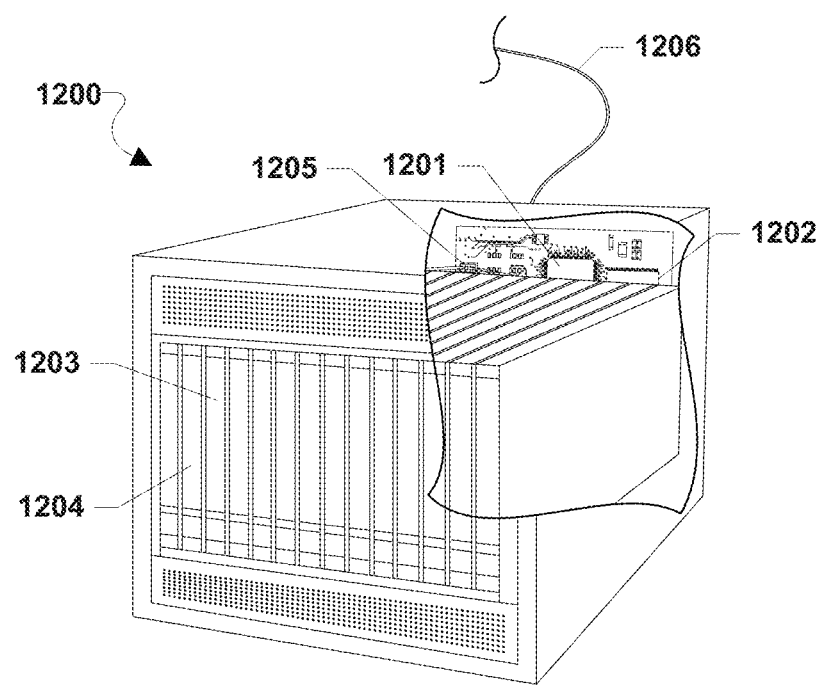
FIG. 12 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1200 illustrated in FIG. 12. Such a server 1200 typically includes a processor 1201 coupled to internal memory 1202 (e.g., volatile memory) and a large capacity nonvolatile memory 1203, such as a disk drive. The server 1200 may also include a floppy disc drive, compact disc (CD) or DVD disc drive 1204 coupled to the processor 1201. The server 1200 may also include network access ports 1205 coupled to the processor 1201 for establishing data connections with a network 1206, such as a local area network coupled to other broadcast system computers and servers. The processor 1201 may be any programmable microprocessor, microcomputer or multiple processor chip or chips that may be configured by software instructions (applications) to perform a variety of functions, including the functions of the various embodiments described above. Typically, software applications may be stored in the memory 1202, 1203 before they are accessed and loaded into the processor 1201. The processor 1201 may include internal memory sufficient to store the application software instructions.

Figure 13:
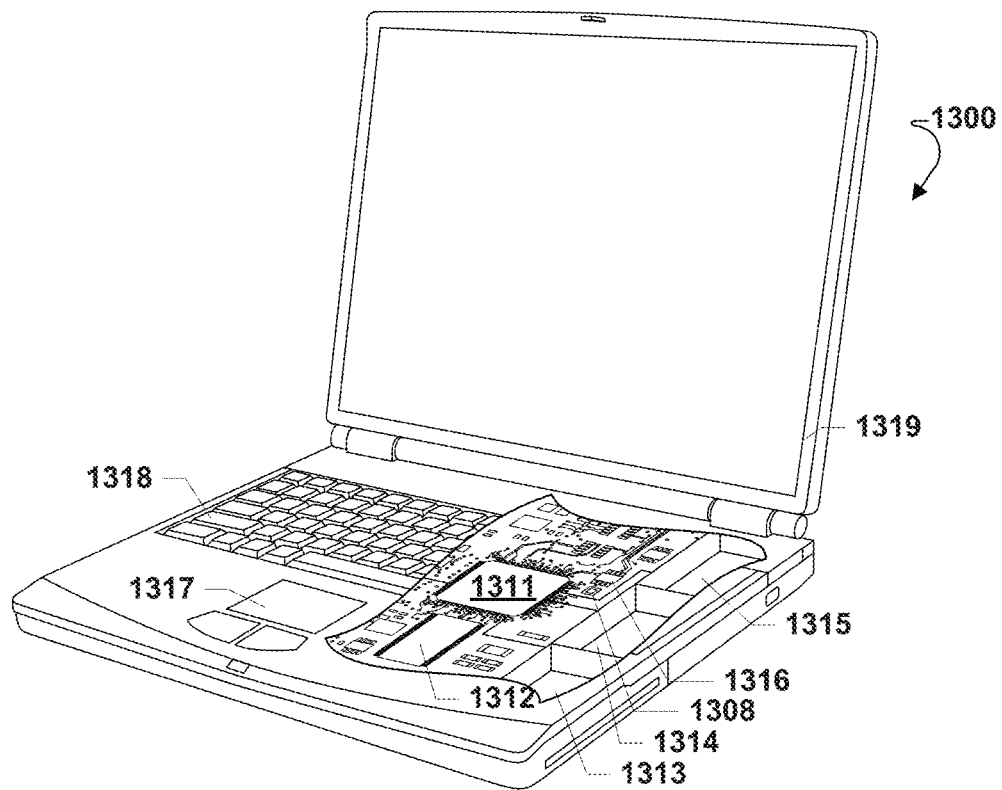
FIG. 13 is a component block diagram of a laptop that is a computing device suitable for use in the various embodiments.

The various embodiments described above may also be implemented within a variety of computing devices, such as a laptop computer 1300 illustrated in FIG. 13. Many laptop computers include a touchpad 1317 with touch surface that serves as the computer's pointing device, and thus may receive drag, scroll, and flick gestures similar to those implemented on mobile computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the laptop computer 1300 may have one or more antennas 1308 for sending and receiving electromagnetic radiation that may be connected to a wireless data link and/or cellular telephone transceiver 1316 coupled to the processor 1311. The laptop computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for transferring surface information, comprising:
    allocating a voxel data structure bounding both a source mesh and a target mesh, wherein the source mesh and the target mesh use different mesh parameterizations of a three-dimensional object such that the source mesh and the target mesh are representations of same portions of the three-dimensional object at different levels of geometric detail and wherein a data size of the source mesh is larger than a data size that can be supported in a memory;
    loading a first sub-portion of the source mesh into the memory;
    rasterizing the first sub-portion of the source mesh in a source texture coordinate space to produce one or more source fragments for the first sub-portion of the source mesh, each source fragment for the first sub-portion of the source mesh comprising sampled data from a triangle of the first sub-portion of the source mesh and a three-dimensional position on the triangle on a surface of the source mesh;
    for each of the one or more source fragments of the first sub-portion of the source mesh:
        determining a voxel, of the voxel data structure, corresponding to the source fragment's respective three-dimensional position; and
        writing the sampled data of the source fragment into the determined voxel of the voxel data structure;
    replacing the first sub-portion of the source mesh in the memory with a second sub-portion of the source mesh;
    rasterizing the second sub-portion of the source mesh in the source texture coordinate space to produce one or more source fragments for the second sub-portion of the source mesh, each source fragment for the second sub-portion of the source mesh comprising sampled data from a triangle of the second sub-portion of the source mesh and a three-dimensional position on the triangle on the surface of the source mesh;
    for each of the one or more source fragments of the second sub-portion of the source mesh:
        determining a voxel, of the voxel data structure, corresponding to the source fragment's respective three-dimensional position; and
        writing the sampled data of the source fragment into the determined voxel of the voxel data structure; and
    in response to rasterizing all sub-portions of the source mesh, the all the sub-portions of the source mesh including at least the first sub-portion of the source mesh and second sub-portion of the source mesh:
        rasterizing the target mesh in a target texture coordinate space to produce one or more target fragments, wherein each target fragment comprises at least a portion of the sampled data from a triangle of the target mesh and a three-dimensional position on the triangle on a surface of the target mesh; and
        for each of the one or more target fragments:
            determining the voxel of the voxel data structure, nearest a position corresponding to the target fragment; and
            writing the sampled data from the determined voxel of the voxel data structure into texture data of the target mesh at a two-dimensional position of the target fragment in a texture space.

2. The method of claim 1, wherein the voxel data structure is a voxel grid.

3. The method of claim 2, wherein the voxel grid is a spatial hash grid, an octree, or an array with a three-dimensional indexing scheme.

4. The method of claim 2, wherein the voxel grid uses a three-dimensional bounding box.

5. The method of claim 2, wherein a resolution of the voxel grid is allocated based on a target texture resolution or a bounding box size and distance in space.

6. The method of claim 1, wherein voxels in the voxel data structure store surface information as a single value of a single surface sample.

7. The method of claim 1, wherein voxels in the voxel data structure store surface information as an average of more than one surface sample.

8. The method of claim 1, wherein the sampled data is a texture coordinate.

9. The method of claim 1, wherein the sampled data is a texture coordinate and one or more other per-vertex attributes.

10. The method of claim 1, wherein:
    determining the voxel of the voxel data structure corresponding the source fragment's respective three-dimensional position and writing the sampled data of the source fragment into the determined voxel of the voxel data structure for each of the one or more source fragments of the first sub-portion of the source mesh are operations of a processor performed in a first same compute pass; and
    determining the voxel of the voxel data structure corresponding the source fragment's respective three-dimensional position and writing the sampled data of the source fragment into the determined voxel of the voxel data structure for each of the one or more source fragments of the second sub-portion of the source mesh are operations of the processor performed in a second same compute pass.

11. The method of claim 1, wherein:
    determining the voxel of the voxel data structure corresponding the source fragment's respective three-dimensional position is an operation performed in a first separate pass than writing the sampled data of the source fragment into the determined voxel of the voxel data structure for each of the one or more source fragments of the first sub-portion of the source mesh; and
    determining the voxel of the voxel data structure corresponding the source fragment's respective three-dimensional position is an operation performed in a second separate pass than writing the sampled data of the source fragment into the determined voxel of the voxel data structure for each of the one or more source fragments of the second sub-portion of the source mesh.

12. The method of claim 1, wherein determining the voxel, of the voxel data structure, nearest the position corresponding to the target fragment comprises searching the voxel data structure for a nearest voxel within a neighbor search radius to the three-dimensional position on a target surface of the target mesh and wherein the neighbor search radius is equal to a size of cells in vertex clustering used to produce the target mesh.

13. The method of claim 1, further comprising rendering at least a portion of the target mesh with the sampled data written into the texture data on a display.

14. A computing device, comprising:
a graphic display;
a memory configured to support a data size; and
a processor connected to the graphic display and the memory, wherein the processor is configured with processor executable instructions to perform operations comprising:
allocating a voxel data structure bounding both a source mesh and a target mesh, wherein the source mesh and the target mesh use different mesh parameterizations of a three-dimensional object such that the source mesh and the target mesh are representations of same portions of the three-dimensional object at different levels of geometric detail and wherein a data size of the source mesh is larger than the data size supported by the memory;
loading a first sub-portion of the source mesh into the memory;
rasterizing the first sub-portion of the source mesh in a source texture coordinate space to produce one or more source fragments for the first sub-portion of the source mesh, each source fragment for the first sub-portion of the source mesh comprising sampled data from a triangle of the first sub-portion of the source mesh and a three-dimensional position on the triangle on a surface of the source mesh;
for each of the one or more source fragments of the first sub-portion of the source mesh:
determining a voxel, of the voxel data structure, corresponding to the source fragment's respective three-dimensional position; and
writing the sampled data of the source fragment into the determined voxel of the voxel data structure;
replacing the first sub-portion of the source mesh in the memory with a second sub-portion of the source mesh;
rasterizing the second sub-portion of the source mesh in the source texture coordinate space to produce one or more source fragments for the second sub-portion of the source mesh, each source fragment for the second sub-portion of the source mesh comprising sampled data from a triangle of the second sub-portion of the source mesh and a three-dimensional position on the triangle on the surface of the source mesh;
for each of the one or more source fragments of the second sub-portion of the source mesh:
determining a voxel, of the voxel data structure, corresponding to the source fragment's respective three-dimensional position; and
writing the sampled data of the source fragment into the determined voxel of the voxel data structure; and
in response to rasterizing all sub-portions of the source mesh, the all the sub-portions of the source mesh including at least the first sub-portion of the source mesh and second sub-portion of the source mesh:
rasterizing the target mesh in a target texture coordinate space to produce one or more target fragments, wherein each target fragment comprises at least a portion of the sampled data from a triangle of the target mesh and a three-dimensional position on the triangle on a surface of the target mesh; and
for each of the one or more target fragments:
determining the voxel of the voxel data structure, nearest a position corresponding to the target fragment; and
writing the sampled data from the determined voxel of the voxel data structure into texture data of the target mesh at a two-dimensional position of the target fragment in a texture space.

15. The computing device of claim 14, wherein the processor is configured with processor-executable instructions to perform operations such that the voxel data structure is a voxel grid.

16. The computing device of claim 15, wherein the processor is configured with processor-executable instructions to perform operations such that the voxel grid is a spatial hash grid, an octree, or an array with a three-dimensional indexing scheme.

17. The computing device of claim 15, wherein the processor is configured with processor-executable instructions to perform operations such that the voxel grid uses a three-dimensional bounding box.

18. The computing device of claim 15, wherein the processor is configured with processor-executable instructions to perform operations such that a resolution of the voxel grid is allocated based on a target texture resolution or a bounding box size and distance in space.

19. The computing device of claim 14, wherein the processor is configured with processor-executable instructions to perform operations such that voxels in the voxel data structure store surface information as a single value of a single surface sample.

20. The computing device of claim 14, wherein the processor is configured with processor-executable instructions to perform operations such that voxels in the voxel data structure store surface information as an average of more than one surface sample.

21. The computing device of claim 14, wherein the processor is configured with processor-executable instructions to perform operations such that the sampled data is a texture coordinate.

22. The computing device of claim 14, wherein the processor is configured with processor-executable instructions to perform operations such that the sampled data is a texture coordinate and one or more other per-vertex attributes.

23. The computing device of claim 14, wherein the processor is configured with processor-executable instructions to perform operations such that:
determining the voxel of the voxel data structure corresponding the source fragment's respective three-dimensional position and writing the sampled data of the source fragment into the determined voxel of the voxel data structure for each of the one or more source fragments of the first sub-portion of the source mesh are operations of the processor performed in a first same compute pass; and
determining the voxel of the voxel data structure corresponding the source fragment's respective three-dimensional position and writing the sampled data of the source fragment into the determined voxel of the voxel data structure for each of the one or more source fragments of the second sub-portion of the source mesh are operations of the processor performed in a second same compute pass.

24. The computing device of claim 14, wherein the processor is configured with processor-executable instructions to perform operations such that:

determining the voxel of the voxel data structure corresponding the source fragment's respective three-dimensional position is an operation performed in a first separate pass than writing the sampled data of the source fragment into the determined voxel of the voxel data structure for each of the one or more source fragments of the first sub-portion of the source mesh; and determining the voxel of the voxel data structure corresponding the source fragment's respective three-dimensional position is an operation performed in a second separate pass than writing the sampled data of the source fragment into the determined voxel of the voxel data structure for each of the one or more source fragments of the second sub-portion of the source mesh.

25. The computing device of claim 14, wherein the processor is configured with processor-executable instructions to perform operations such that:

determining the voxel, of the voxel data structure, nearest the position corresponding to the target fragment comprises searching the voxel data structure for a nearest voxel within a neighbor search radius to the three-dimensional position on a target surface of the target mesh; and the neighbor search radius is equal to a size of cells in vertex clustering used to produce the target mesh.

26. A non-transitory processor readable medium having stored thereon processor-readable instructions configured to cause a processor of a computing device to perform operations comprising:

allocating a voxel data structure bounding both a source mesh and a target mesh, wherein the source mesh and the target mesh use different mesh parameterizations of a three-dimensional object such that the source mesh and the target mesh are representations of same portions of the three-dimensional object at different levels of geometric detail and wherein a data size of the source mesh is larger than a data size that can be supported in a memory of the computing device;

loading a first sub-portion of the source mesh into the memory;

rasterizing the first sub-portion of the source mesh in a source texture coordinate space to produce one or more source fragments for the first sub-portion of the source mesh, each source fragment for the first sub-portion of the source mesh comprising sampled data from a triangle of the first sub-portion of the source mesh and a three-dimensional position on the triangle on a surface of the source mesh;

for each of the one or more source fragments of the first sub-portion of the source mesh:
determining a voxel, of the voxel data structure, corresponding to the source fragment's respective three-dimensional position; and
writing the sampled data of the source fragment into the determined voxel of the voxel data structures;

replacing the first sub-portion of the source mesh in the memory with a second sub-portion of the source mesh;

rasterizing the second sub-portion of the source mesh in the source texture coordinate space to produce one or more source fragments for the second sub-portion of the source mesh, each source fragment for the second sub-portion of the source mesh comprising sampled data from a triangle of the second sub-portion of the source mesh and a three-dimensional position on the triangle on the surface of the source mesh;

for each of the one or more source fragments of the second sub-portion of the source mesh:
determining a voxel, of the voxel data structure, corresponding to the source fragment's respective three-dimensional position; and
writing the sampled data of the source fragment into the determined voxel of the voxel data structure; and in response to rasterizing all sub-portions of the source mesh, the all the sub-portions of the source mesh including at least the first sub-portion of the source mesh and second sub-portion of the source mesh:
rasterizing the target mesh in a target texture coordinate space to produce one or more target fragments, wherein each target fragment comprises at least a portion of the sampled data from a triangle of the target mesh and a three-dimensional position on the triangle on a surface of the target mesh; and
for each of the one or more target fragments:
determining the voxel of the voxel data structure, nearest a position corresponding to the target fragment; and
writing the sampled data from the determined voxel of the voxel data structure into texture data of the target mesh at a two-dimensional position of the target fragment in a texture space.

27. The method of claim 1, wherein the memory is a buffer.

28. The computing device of claim 14, wherein the memory is a buffer.

29. The non-transitory processor readable medium of claim 26, wherein the memory of the computing device is a buffer.

* * * * *